US009418050B1

(12) United States Patent
Brewster

(10) Patent No.: US 9,418,050 B1
(45) Date of Patent: Aug. 16, 2016

(54) OBTAINING ATTRIBUTION INFORMATION FOR REPRESENTATIONS

(71) Applicant: Pinterest, Inc., San Francisco, CA (US)

(72) Inventor: Kent Stanley Brewster, East Palo Alto, CA (US)

(73) Assignee: Pinterest, Inc., San Francisco, CA (US)

( * ) Notice: Subject to any disclaimer, the term of this patent is extended or adjusted under 35 U.S.C. 154(b) by 363 days.

(21) Appl. No.: 13/737,701

(22) Filed: Jan. 9, 2013

(51) Int. Cl.
*G06F 17/21* (2006.01)

(52) U.S. Cl.
CPC ..................................... *G06F 17/21* (2013.01)

(58) Field of Classification Search
CPC .............................. G06F 17/2247; G06F 17/21
USPC ........................................................ 715/234
See application file for complete search history.

(56) References Cited

U.S. PATENT DOCUMENTS

| | | | | |
|---|---|---|---|---|
| 6,539,424 B1 * | 3/2003 | Dutta | ............................ | 709/219 |
| 6,718,328 B1 * | 4/2004 | Norris | ............................ | 709/229 |
| 8,296,190 B1 * | 10/2012 | Lemmons et al. | ............. | 705/26.1 |
| 8,401,924 B1 * | 3/2013 | Rajyaguru | .......... | G06Q 30/0629 |
| | | | | 705/26.1 |
| 2005/0125285 A1 * | 6/2005 | McQueeney et al. | ............ | 705/14 |
| 2005/0125358 A1 * | 6/2005 | Levin et al. | ...................... | 705/59 |
| 2005/0278258 A1 * | 12/2005 | O'Donnell et al. | .............. | 705/59 |
| 2007/0043583 A1 * | 2/2007 | Davulcu | ............. | G06F 17/30864 |
| | | | | 705/1.1 |
| 2008/0059211 A1 * | 3/2008 | Brock et al. | ....................... | 705/1 |
| 2008/0059426 A1 * | 3/2008 | Brock et al. | ....................... | 707/3 |
| 2008/0066194 A1 * | 3/2008 | Ketola | ..................... | H04L 63/40 |
| | | | | 726/33 |
| 2008/0288332 A1 * | 11/2008 | Altounian | ............... | G06Q 30/06 |
| | | | | 705/26.4 |
| 2010/0070899 A1 * | 3/2010 | Hunt et al. | ...................... | 715/769 |
| 2010/0268628 A1 * | 10/2010 | Pitkow et al. | .................... | 705/34 |
| 2012/0011432 A1 * | 1/2012 | Strutton | .................. | G06Q 30/02 |
| | | | | 715/234 |
| 2012/0317657 A1 * | 12/2012 | Glimcher | ........... | G06Q 30/0603 |
| | | | | 726/29 |
| 2013/0246277 A1 * | 9/2013 | Moseley | ................. | G06Q 30/06 |
| | | | | 705/58 |
| 2013/0275275 A1 * | 10/2013 | Lemmons et al. | ............ | 705/27.1 |
| 2013/0275276 A1 * | 10/2013 | Lemmons et al. | ............ | 705/27.1 |
| 2014/0006931 A1 * | 1/2014 | Pettitt et al. | ..................... | 715/234 |

OTHER PUBLICATIONS

Seneviratne, Oshani, Lalana Kagal, Daniel Weitzner, Hal Abelson, Tim Berners-Lee, and Nigel Shadbolt. "Detecting creative commons license violations on images on the world wide web." WWW2009, Apr. 2009.*

* cited by examiner

*Primary Examiner* — Frank D Mills
(74) *Attorney, Agent, or Firm* — Athorus, PLLC

(57) ABSTRACT

This disclosure describes systems and methods that enable attribution information to be obtained and associated with digital items, also referred as representations, as well as enable supplemental information to be associated with the representations. In some implementations, a user may request to use a representation and the system may determine that attribution information is to be obtained from a rights holder and/or provider of the representation. When the attribution information is obtained it is associated with the representation that is available for use by the user.

27 Claims, 11 Drawing Sheets

OBTAINING ATTRIBUTION INFORMATION FOR REPRESENTATIONS

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products, and receive news, just to name a few. Other uses include e-commerce shopping, communicating with social communities, friends and family, photography, and many others.

In many computing environments, digital items may propagate in ways that make it difficult to determine the original source of the digital item. This is especially true on the World Wide Web, which is designed to make it easy for one webpage to use digital items from many other webpages. This often results in use or presentation of the digital items without proper attribution information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
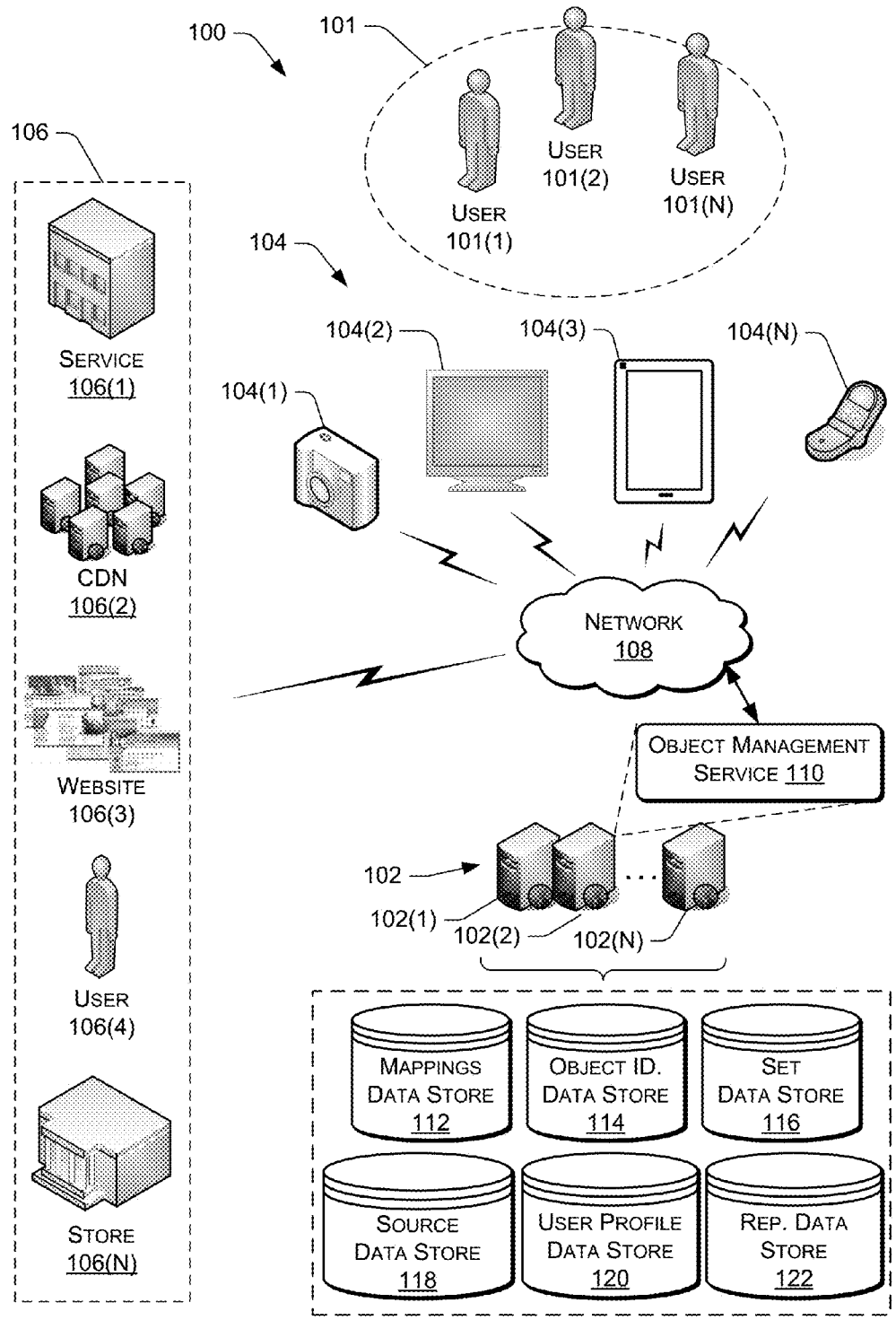
FIG. 1 is a pictorial diagram of an illustrative environment that includes a server system and a client device communicatively connected via a network.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes, in part, systems and methods that enable gathering and use of attribution information for digital items, also referred to herein as representations, and, in some implementations, allow rights holders of those digital items to control how those items are used, as well as provide supplemental information for those items. In various computing environments, such as the Internet, representations (e.g., images, video, audio) are often made available to other users for viewing, copying, sharing etc. In some instances, the representations may be made available by the rights holder(s) of those representations, by another entity authorized by the rights holder(s), or by others who have obtained a copy or are otherwise accessing and presenting the representation.

For purposes of this discussion, a "presenter site," as used herein, refers to a site or other external source, such as a web page, that may be accessed by a user and which presents representations to a user. A "provider," as used herein, is a site or other external source that hosts or is otherwise the provider of a representation. Finally, a "consumer site," as used herein, is a site or other external source that obtains a representation from a provider for presentation. As further discussed below, a presenter site may be either and/or both a provider and a consumer site.

The following example provides further illustration for the above terminology. A photo sharing site may host images on behalf of one or more rights holders of those images. In this aspect, the photo sharing site is a provider. The photo sharing site may also be a presenter site if one or more of those representations are made available to users by the photo sharing site. Likewise, the photo sharing site may also be a consumer site if one or more of the representations made available to users by the photo sharing site are obtained from another provider.

To further illustrate, the photo sharing site may maintain a web page (http://www.photoshare.com) that is accessible by users via a browser application through which representations are presented to those users. In such an example, when the web page of the photo sharing site is accessed, a browser application first downloads HTML code of the web page and may use a representation identifier included in the HTML code to obtain the representation from the provider for inclusion in the web page. If the HTML code includes a representation identifier that only identifies the representation, such as <img src="picture.jpg"/>, or identifies the same location as the presenter, such as <img src="http://www.photoshare.com/picture.jpg", the browser application may assume that the presenter site and the provider are the same and obtain the image from http://www.photoshare.com. In other implementations, before assuming that the presenter site and the provider are the same, the browser application may determine if there is a base location identifier in the code that identifies a provider of the representation.

In comparison, the photo sharing site may be a consumer site if the HTML code includes a representation identifier that identifies both a provider and the representation, such as <img src="http://www.example.com/picture.jpg"/>). In this instance, the browser will contact the provider specified by the representation identifier (http://www.example.com), and request the representation (picture.jpg). The technique of obtaining a representation from another provider is known as "inline linking" (or direct linking, hotlinking).

As will be appreciated, code of a web page may include multiple representation identifiers. Some of those representation identifiers may identify representations provided by the provider of the web page, while others may identify representations provided by other providers. In such an instance, a presenter site may be both a provider and a consumer site.

Inline linking is an intended feature of many computing environments because it allows a simple way to share representations and information. However, some consumer sites may inline link to representations from providers without providing appropriate attribution and/or obtaining authorization, also known as leeching.

The implementations described herein provide a mechanism for obtaining appropriate attribution information for a representation before it is utilized or embedded on a destination presenter site. The implementations may be used for representations on a presenter site where the presenter is the provider as well as representations on a presenter site where the presenter site is a consumer site. For example, if a user requests to embed onto a destination presenter site an inline linked representation from a presenter site, the representation identifier (e.g., URL) included in the code of the presenter site may be obtained and used to identify the provider of the representation. In a simple example, the provider (e.g., www.example.com) may be identified directly in the representation identifier, identified in a base reference in the code to a provider or assumed to be the same as the presenter site if the representation identifier only identifies the representation. However, in many instances, the representation identifier may reference a content delivery network ("CDN"), or a cache within a CDN, where a copy of the representation is delivered on behalf of the provider. In other instances, the representation identifier may reference a seemingly anonymous location from which the representation is obtained.

In instances where the provider of the representation cannot be determined directly from the representation identifier, the representation identifier may be compared to a provider list that identifies addresses, locations, CDNs or other identifiers associated with various providers to identify a provider of the representation. Alternatively, or in addition thereto, the representation identifier may be provided to the identified CDN and the CDN may return the identity of the provider of the representation.

Once the provider of the representation is identified, the systems and methods described herein may submit an attribution information request to the provider for attribution information related to the representation, as well as any supplemental information relating to the representation. In some implementations, the request may also seek authorization to inline link to the representation, or otherwise access the representation. In other implementations, authorization to use the representation may be assumed, unless a denial or other restriction is returned as part of the attribution information request response. In some implementations, the information supplied may be static. In other implementations, it may be dynamic. Static supplemental information is any information that does not change. Dynamic supplemental information is any information that may be updated.

Attribution information, as used herein, may include, but is not limited to, the type of representation (e.g., audio, video, image), the width, height and/or depth with which the representation should be presented, the representation that is to be presented, a thumbnail of the representation, the title of the representation, the representation identifier (e.g., URL) for the location of the representation, the identity of the author or rights holder(s) of the representation, the identifier (e.g., URL) for the rights holder(s) web site, the identity of the provider of the representation, the identifier for the provider's site, etc. For some forms of representations (e.g., video), additional information specifying how the representation is to be presented may also be included in the attribution information.

A rights holder may be any entity that owns one or more rights in the representation and/or the represented object, such as an author or publisher. Representations may be associated with any number of entities, such as publishers, distributors, resellers, agents, editors, contributors, manufacturers, etc. that may be entitled or otherwise have an interest in the representation and/or the represented object. For purposes of simplification, "rights holders" as used herein may refer to one or more of the above entities.

Supplemental information, as used herein, may be any additional information that may be associated with a representation. For example, supplemental information may include, but is not limited to, information about the representation, information about an object represented by the representation, the price of the representation, the price of an object represented by the representation, availability of the representation, availability of the represented object, location of the represented object, location of the rights holder, advertisements, etc. Supplemental information may be provided by the rights holder(s) of the representation, the provider, the consumer, or any other external source. In some implementations, supplemental information may also be periodically updated by external sources, providers, rights holders, consumers and/or include actions that may be performed by users interacting with the representation.

In some implementations, a user may select a representation from a presentation site for use in creating an object identifier at a destination presentation site. Utilizing the implementations described herein, appropriate attribution information may be obtained for use with the representation and included in the object identifier. For example, as an object identifier is being created, the returned attribution information, such as identity of rights holder(s) of the representation (and/or the represented object), the source of the representation, etc., may be included in the object identifier, thereby providing proper attribution for the representation and/or the represented object. Likewise, returned supplemental information, such as the price of the representation, price of the represented object, etc. may be included in the object identifier, thereby providing additional information to a viewer of the object identifier. In some implementations, the attribution information included in the object identifier may be revised. In other implementations, the attribution information may not be changed once provided.

For purposes of discussion, an "object identifier," as used herein, is a collection of one or more items of information that identifies an object based on a user's perspective, or context. The object identifier may include any combination of: a representation for the object, such as a graphical representation, audible representation, or other representation of the object; attribution information regarding the representation and/or the object; a context for the object as understood by the user; a description of the object provided by the user; supplemental information about the representation and/or the object; the set to which the object belongs (discussed below); the source of the object; the provider of the representation; the rights holder(s) of the representation and/or the object; any parent object identifier from which the object identifier was created; and any identification of other similar object identifiers. As will be appreciated, additional or fewer items of information may be included in an object identifier.

The methods and systems described herein further enable users to manage, search for, share and discover representations/objects by organizing object identifiers into "sets." For example, users may create one or more sets and object identifiers may be associated with those sets. Generally, a "set" is a collection of object identifiers created by a user. In one implementation, each set may include any number of object identifiers, including zero (a null set). An object identifier may be associated with one or many sets. In one implementation, an object identifier may only be associated with one set.

Users can create object identifiers and add them to sets based on representations for objects provided or identified by the user or by adding existing object identifiers to their own set of object identifiers. Additional information regarding object identifiers and sets can be found in U.S. patent application No. 61/725,462, titled "Management of Objects According To User Context," filed Nov. 12, 2012, the disclosure of which is incorporated by reference herein in its entirety. An "object" may be anything that can be represented. For example, a user may create an object identifier for a television show, an image, a physical object, a sound, a web page, a location, a digital object, and the like. A "representation," as used herein, may be any form of a digital item (e.g., image, video, audio) that represents an object. In some instances, the representation may also be the object.

FIG. 1 is a pictorial diagram of an illustrative environment 100 that includes users 101, such as users 101(1), 101(2)-101(N), a server system 102 that includes one or more server computers 102(1), 102(2)-102(N), one or more client devices 104, such as client device 104(1), 104(2), 104(3)-104(N), and one or more external sources 106, such as a service offering 106(1), content delivery network 106(2), website 106(3), user 106(4)-store 106(N) communicatively connected via a network 108. As will be appreciated, any number and/or type of server systems 102, client devices 104 and/or external sources 106 may be included in the environment 100 and those illustrated in FIG. 1 are only exemplary. Likewise, any number of users 101 may be included in the environment 100. For purposes of this discussion, the term "user" will be used herein to refer to an individual interacting with the server system 102, object management service 110 (discussed below), and/or one or more of the external sources 106.

The network 108 may include a local area network, a wide area network, such as a public switched telephone network (PSTN), a cable television network, a satellite network, a collection of networks, a public Internet protocol network, a private Internet protocol network, or a combination thereof. Moreover, the network 108 may be wired, wireless, or a combination of the two. The server system 102 may also include a mappings data store 112, an object identifier data store 114, a set data store 116, a source data store 118, a user profile data store 120, and a representation data store 122. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The mappings data store 112, object identifier data store 114, set data store 116, source data store 118, user profile data store 120, and representation data store 122 may be integrated with the server system 102 or otherwise communicatively coupled with the server system 102. For example, one or more of the mappings data store 112, object identifier data store 114, set data store 116, source data store 118, user profile data store 120, and representation data store 122 may be located at a remote computing resource (not shown) and communicatively coupled with the server system 102. In some implementations, the mappings data store 112, object identifier data store 114, set data store 116, source data store 118, user profile data store 120, and representation data store 122 may include one or more CD-RW/DVD-RW drives, hard disk drives, solid-state drives, tape drives, or other storage devices that are utilized to store digital content and information. The server system 102, separately or together with the mappings data store 112, object identifier data store 114, set data store 116, source data store 118, user profile data store 120, and representation data store 122 may provide an object management service 110 that facilitates user 101 exploration, creation, management and sharing of object identifiers and/or sets into which one or more object identifiers may be included. The object management service may also facilitate the adding and/or updating of supplemental information by external sources 106 and/or the object management service 110. The object management service 110 also facilities obtaining attribution information and/or supplemental information for representations that are to be included in an object identifier or otherwise used.

In some implementations, the server system 102 may also be configured to exchange information with one or more external sources 106. The external sources 106 may include any type of entity and/or individual(s) that provides a service, website, product or information that may be used to supplement an object identifier and/or representation of an object and/or from which a representation, attribution information and/or supplemental information may be obtained. For example, one external source may be a provider, consumer and/or presenter site. As further examples, external sources 106 may include a service offering 106(1), such as local weather, time, streaming video of a location, etc., CDN 106(2), websites 106(3), users 106(4) and stores 106(N), such as a toy store, grocery store, electronic commerce (e-commerce) store, book store, etc. External sources may be associated with a fixed location(s), such as their place of business, a location that may change (e.g., hiking guide, mobile health provider) depending on the external sources' current location, or no location at all (e.g., digital or virtual business). Digital or virtual businesses, such as websites 106(3), include any form of e-commerce or other digital offering that may provide representations and/or supplemental information.

For example, a user may obtain a representation from an e-commerce site (presenter site). Likewise, the e-commerce site may provide a shopping cart or purchase button, also referred to herein as a buy button, and a price for the object identified in the representation, (the buy button and the price are both supplemental information) that can be used to provide pricing information as well as initiate an action to purchase the represented object. A user, when viewing the object identifier that includes the representation of the object with which the e-commerce site has associated a price and purchase button, may also view the price for the object and interact with the purchase button to initiate a purchase of the represented object.

In some implementations, the external source 106 may interact with the object management service 110 and provide representations for objects along with attribution information and/or supplemental information that could then be used to form object identifiers for users. For example, if the representation selected by a user for which an object identifier is to be created is from a presenter site and the representation is inline linked (the presenter site is also a consumer site), the object management service 110 may identify the provider of the representation and obtain attribution information for the representation, as well as any supplemental information about the representation and/or the represented object. In response to that request, the provider may return, as part of the attribution information, a representation that is to be used in creating the object identifier, an identifier for the provider, the identity of the rights holder(s) of the representation and/or the represented object, etc.

The provider may also deliver supplemental information, such as the price of the representation or represented object, the availability of the object, location of the provider, hours of operation, contact information, etc.

In some implementations, the presenter site may also provide supplemental information that is associated with the representation. For example, many blog sites (presenter site) recommend and/or promote products that are for sale at an e-commerce site. When users visit the e-commerce site from the blog site, the blog site may receive a referral fee from the e-commerce site. To maintain the referral fee, the blog site (presenter site) may provide supplemental information such that when the representation is used in an object identifier (at a destination presenter site), the referral fees may still be maintained when a user traverses to the e-commerce site from the object identifier.

Attribution information and/or supplemental information may also be periodically updated and/or updated each time a user views the object identifier. Those updates are reflected in the object identifiers that include the representation. For example, the provider may periodically update the price of a representation. The updated price will be presented each time the representation and/or the corresponding object identifier(s) are viewed.

Returning to FIG. 1, client devices 104 may include personal computers, tablet computers, eBook reader devices, laptop computers, desktop computers, netbooks, personal digital assistants (PDA), portable gaming devices, wireless communication devices, such as smart phones or mobile handsets, set-top-boxes, game consoles, cameras, audio recorders/players, or any combination thereof. As will be described with regard to the implementations shown herein, the server system 102 is configured to exchange data and information, including information about users, sets, representations, object identifiers, and other like information, with the client device 104. For example, the object management service 110 may interact via the server system 102 to determine a user's location, provide representations of objects near the user's location, enable a user to select a representation of an object, create an object identifier and include that object identifier in a user's set of object identifiers.

Likewise, a user 101 may interact with the object management service 110, via a client device 104, to create, discover and view object identifiers and sets of object identifiers, obtain information about (or purchase) objects identified by an object identifier, and/or to communicate with others. For example, a user 101, Steve in this example, may submit a request to create an object identifier for a race car by selecting to use an image (representation) of a race car at a presenter site. The user, Steve, may provide a description, such as "The race car I drove for my birthday present!" for inclusion in the object identifier and the client device may also identify and associate the user's location with the request.

The client device 104 may also identify the provider for the representation and obtain attribution information and/or supplemental information that is included with the representation to create the object identifier. As discussed below, attribution information and/or supplemental information may be obtained from a provider by the client device and/or by the object management service 110.

Supplemental information may be provided by the provider, the rights holder(s) of the representation and/or other external sources. This information may be updated and/or changed each time a user views the object identifier. For example, the race car driving school that provides opportunities for people to experience the thrill of driving a race car may be the provider of the representation selected by Steve and may provide supplemental information, such as contact information, location, website, pricing, etc., that is associated with the representation of the race car and, as a result, included in the object identifier created by Steve that includes the representation of the race car. In some implementations, other external sources, such as nearby hotels, travel agencies, etc. may also provide supplemental information (e.g., advertisements) that are associated with the representation and/or the object identifier. These other external sources may be randomly selected, identified by the provider and/or rights holder(s) of the representation or object, or associated with the representation and/or object identifier by other means.

Other users of the object management service 110 may interact with the same or different client device 104 and explore the object management service 110. If supplemental information is associated with the object identifier, that information may be updated and current supplemental information provided to users when viewing the object identifier. In some examples, the supplemental information may be updated based on information about the user viewing the object identifier, regardless of whether they were the creator of the object identifier. Continuing with the above example, if the race car driving school has multiple locations, the supplemental information regarding location, contact information, etc. may be updated to represent the location of the race car school that is nearest to the user currently viewing the object identifier. For example, Steve may have driven the race car at a school in California and when he views the object identifier, receives information about the California school. However, when a different user, Greg, who is located in Texas, views the object identifier, he receives supplemental information about the Texas school. Likewise, Greg may receive supplemental information from other external sources based on Greg's location.

The mappings data store 112 stores information about the relationships between object identifiers, sets, users, representations, presenters, providers, consumers and other external sources. For example, for each object identifier, a link or other reference to the rights holder(s) of the representation and/or the object represented by the object identifier is maintained. Likewise, an identifier (e.g., URL) for the provider of the representation may also be maintained.

The object identifier data store 114 maintains information about each object identifier created by the object management service 110. For example, for each object identifier, the object management service 110 may store in the object identifier data store 114 information as to the representation included in the object identifier, the set to which the object identifier is associated, the user that created the object identifier, the context for the object identifier, any user provided description for the object identifier, any supplemental information associated with the object identifier, the provider of the representation included in the object identifier and any parent object identifier from which information was obtained.

The set data store 116 includes information about each set established by users of the object management service 110. As discussed above, a set is a collection of object identifiers that a user creates. A set may be a null set that does not include any object identifiers. Likewise, any number of object identifiers may be associated with a set. The set data store 116 for each set stores information that identifies the user that created the set, the context for the set, a category for the set, any user provided description for the set, any static information associated with the set and an identification of object identifiers associated with the set.

The source data store 118 stores information about sources of objects that are represented by object identifiers managed by the object management service 110 and/or information about external sources that provide supplemental information associated with representations of one or more objects. In some examples, the source may be a presenter site, provider, or consumer site from which a representation was obtained to create an object identifier. In other examples, the source may be a physical location. In still other examples, a source may be any external source that provides supplemental information that is associated with representations of objects. For example, an external source may be a weather service that provides current weather information that is periodically updated and provided to users when viewing object identifiers for objects at specific locations. The source data store 118 may include any form of information about each source including, but not limited to, the name of the source, whether the source has been verified by the object management service 110, the type of information provided by the source, identification of representations associated with the source, and the like.

The user profile data store 120 stores information about users 101 of the object management service 110. Any type of information may be stored in the user profile data store 120. For example, user profile information, such as attributes, name, address, gender, browse history, object identifier history, set history, social networks and/or friends with which the user 101 interacts, and the like may be stored in the user profile data store 120. User profile information may be provided directly by users 101 and/or collected from users 101 of the client devices 104 when interacting with the object management service 110 (e.g., clickstream data as the user explores the object management service 110), when viewing, creating or interacting with sets, when viewing, creating or interacting with object identifiers, and/or when sharing information with friends or social communities through the object management service 110. In some implementations, user information may be obtained from external sources. For example, user profile information may be obtained from an external source with which the user is also affiliated (e.g., e-commerce web site, social network) and has agreed to allow sharing of some or all user profile information provided to that external source and/or collected by that third party. In some implementations, users of the object management service 110 may choose to limit the amount of information included in their user profile, to limit access to their user profile information and/or to limit what information is shared, if any, from their user profile information.

The representations data store 122 stores representations that are included in one or more object identifiers. In addition to storing representations, attribution information and/or supplemental information about the representation may also be maintained in the representations data store 122. In other implementations, attribution information and/or supplemental information may be maintained in other data stores accessible by the object management service 110. An identification or association with each object identifier that includes the representation may also be maintained in the representations data store 122.

In addition to maintaining information about mappings, object identifiers, sets, sources, users, and representations, the object management service 110 may provide use information back to the users 101 and/or the external sources 106. For example, the object management service 110, through communication between the server system 102 and a client device 104, may provide use information back to a user 101. Such information may include an identification of object identifiers recently viewed, created or added, identification of others that have viewed the user's sets, object identifiers, and the like. Likewise, the object management service 110, through communication between the server system 102 and the external sources 106, may provide information to the external sources 106 (presenter, provider, consumer). Such information may include analytics about representations and/or objects associated with the external source 106, other external sources that may be associated with and provide supplemental information, and the like.

Figure 2:
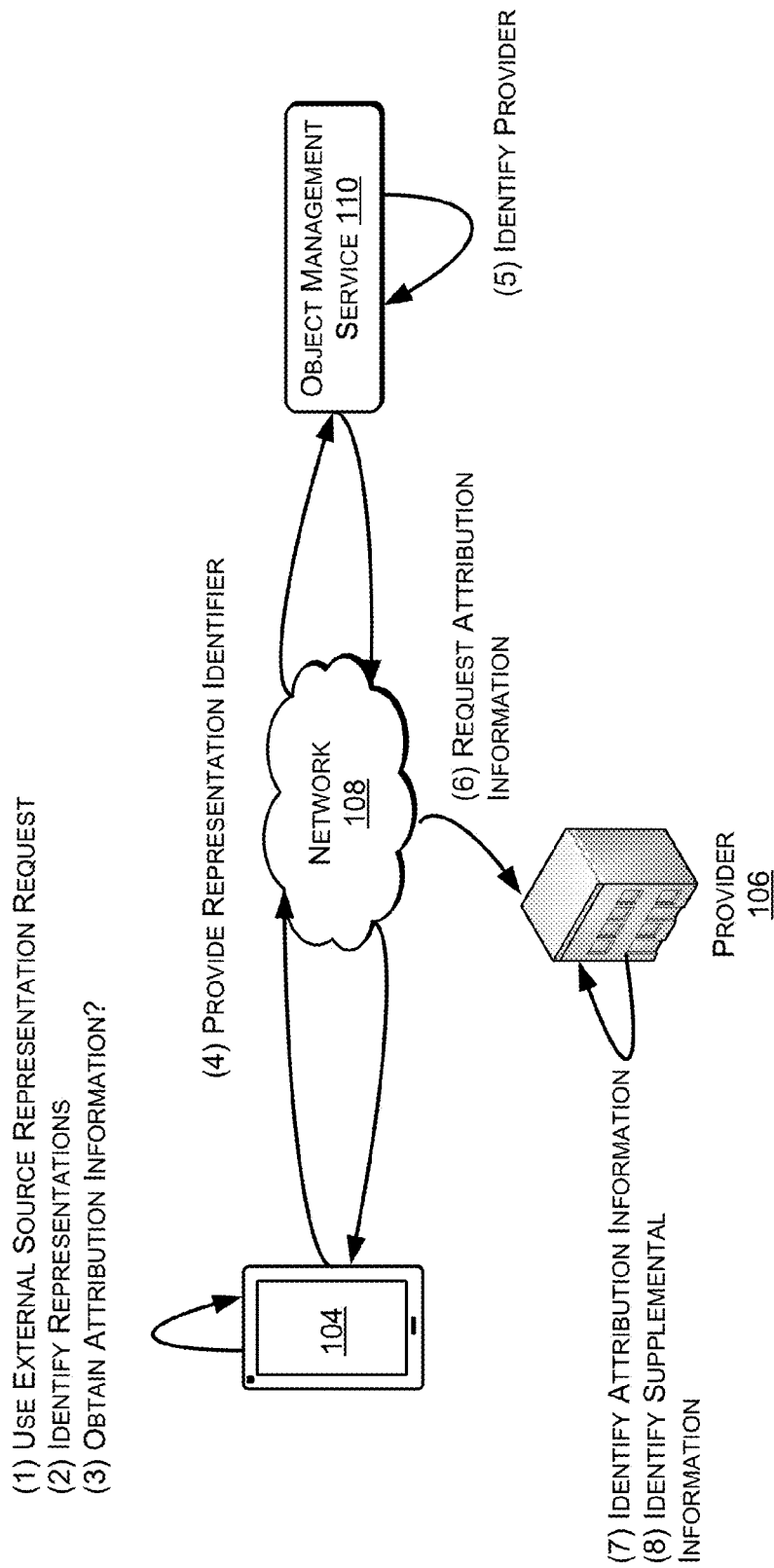
FIGS. 2-3 are block diagrams of an example implementation for obtaining attribution information for a representation, adding object identifiers to a set and accessing an object identifier, according to an implementation.
Figure 3:
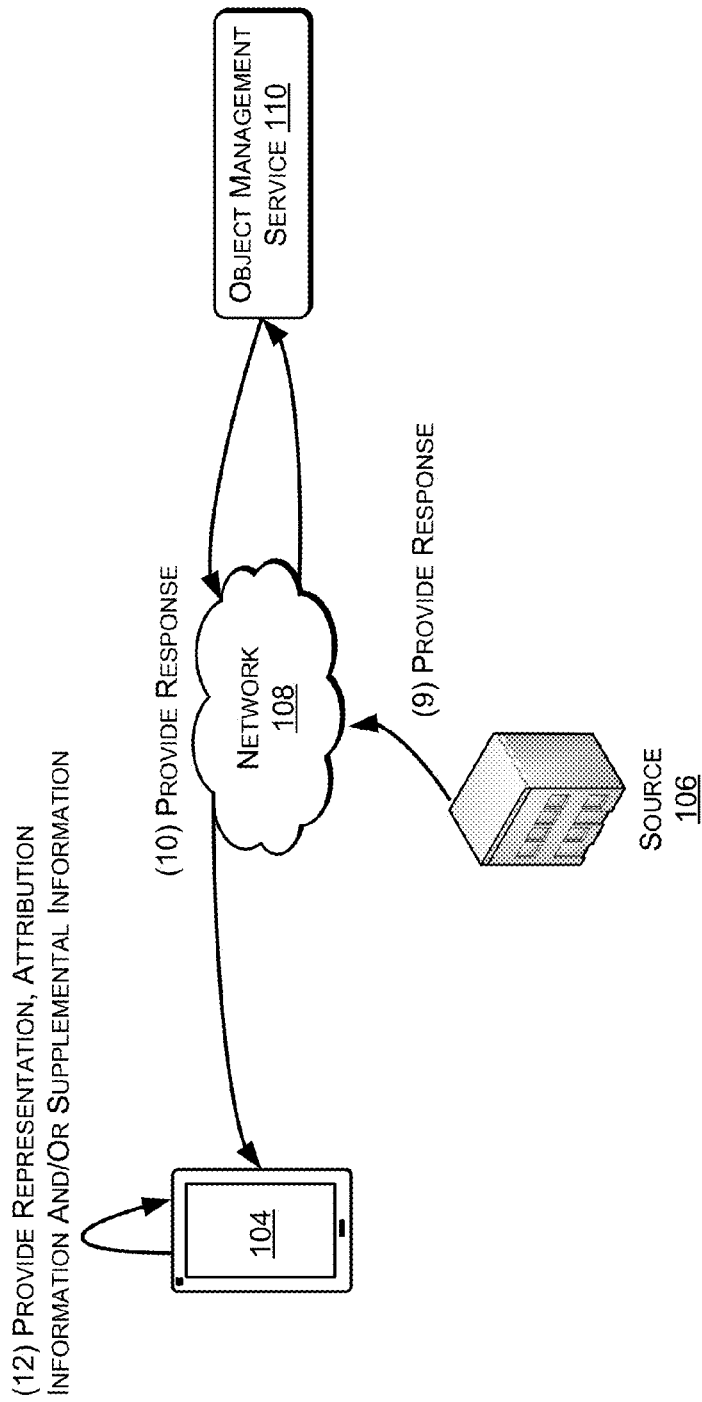

FIGS. 2-3 are block diagrams of example implementations for obtaining attribution information and/or supplemental information for a representation, according to an implementation. The example implementation begins with a user accessing a client device 104 and submitting a request to use a representation accessible from a presenter site. The request may be a request to use a representation in creating an object identifier, a request to embed the representation into another page, such as a blog or other webpage, or any other request to use a representation that is accessible from a presenter site.

Upon initiating the request, one or more representations accessible from the presenter site are identified. For example, if the user is viewing a presenter web page and initiates a request to use a representation included in the web page, each of the representations included in the web page may be identified. As an alternative, the user may identify the representation they desire to use. For example, the request to use a representation may include an identifier (e.g., URL) for a specific representation, or the web page may only include a single representation.

For each identified representation, a determination may be made as to whether attribution information is to be obtained. In some implementations, attribution information may be obtained for all representations. In other implementations, attribution information may be obtained for any representations for which attribution information has not been previously obtained by the object management service 110. In still other implementations, attribution information may only need to be obtained for inline linked representations. For example, if a representation is inline linked from a provider that is not the presenter site, it may be determined that attribution information from the provider is to be obtained. In other examples, if all the representations are provided by the presenter site, attribution information may be obtainable directly from the presenter site.

If it is determined that attribution information is to be obtained, the provider (external source) of the representation is identified. To identify the provider, the representation identifier (e.g., URL) may be obtained from the code of the presenter site and provided by the client device 104 over the network 108 to the object management service 110. The object management service 110 may then parse the representation identifier to identify the provider. In a simple example, the provider (e.g., www.example.com) may be identified directly in the representation identifier. However, in many instances, the representation identifier may reference a CDN, or a cache within a CDN, where a copy of the representation is delivered on behalf of the provider. In other instances, the representation identifier may reference a seemingly anonymous location from which the representation is obtained.

In such instances, the representation identifier may be compared to a provider list maintained by the object management service 110 that identifies CDNs or other identifiers/locations associated with various providers to determine a provider of the representation. Alternatively, or in addition thereto, the representation identifier may be provided to the identified CDN or other location and the identity of the provider of the representation returned. By comparing the representation identifier with a provider list, a provider of a representation may be determined even though there is no apparent connection between the representation identifier and the provider.

The provider list may be established and maintained through relationships between the object management service 110 and the various providers. For example, the provider may identify to the object management service 110 the CDNs it utilizes to deliver content and/or the identifiers of other caches or delivery points that the provider uses to deliver representations. In still other implementations, the provider may include a code or identifier in the locator, representation identifier or within the representation itself that can be used to determine the provider.

Returning to FIG. 2, once the provider of the representation is identified, the object management service 110 may submit a request to the identified provider for attribution information related to the representation. The request may also include a request for any supplemental information relating to the representation. In still other examples, the request may also include a request for authorization to inline link to, or otherwise access the representation.

In some implementations, providers may offer an application programming interface ("API") to which the request is submitted. For example, the representation identifier (e.g., pointer, URL or other locator) of the representation obtained from the presenter site may be provided to the provider's API. Generally speaking, the request is a submission to the provider indicating that a representation at a presenter site has been identified, the object management service believes the representation is from the provider, and, if the representation is from the provider, to provide attribution information for the representation and/or any supplemental information.

A provider, upon receiving an attribution information request, may identify attribution information related to the representation. Attribution information may include, but is not limited to, the type of representation (e.g., audio, video, image), the width, height and/or depth with which the representation should be presented, the representation that is to be presented, a thumbnail of the representation, the title of the representation, the representation identifier (e.g., URL) for the representation, the identity of the author or rights holder(s) of the representation, an identifier (e.g., URL) for the rights holder(s) web site, the identity of the provider where the representation is hosted, the identifier for the provider's site, etc. For some forms of representations (e.g., video), attribution information may also specify how the representation is to be presented. Generally, attribution information relates to any information about the representation, the source of the representation and/or how the representation is to be presented. Attribution information may be provided by the provider, rights holder(s), other external sources, and/or any combination thereof In addition to attribution information, the rights holder(s), provider and/or other external sources may also identify any supplemental information that is to be associated with the representation. As noted above, supplemental information may be any additional information that may be associated with a representation. For example, supplemental information such as the price for the representation or the represented object, contact information, location, availability, etc.

Once the provider has identified the attribution information related to the representation, and any supplemental information, a response is prepared and returned to the object management service 110. The response includes the attribution information and any supplemental information. In some implementations, the response may also include restrictions regarding the use of the representation. For example, the response may indicate restrictions as to how the representation should be used (e.g., copied, inline linked). Likewise, the restriction may be a denial of use.

In instances where the response includes a restriction regarding the use of the representation, the response may also include attribution information. The attribution information may be used to confirm that the response is from the provider and/or rights holder(s) of the representation. In some examples, a reason for the restriction may also be provided.

Upon receipt of a response from the provider 106, the object management service 110 provides the response, or a portion thereof, to the client device 104. In some implementations, all or a portion of the attribution information and/or supplemental information may be provided back to the client device. If the response is a denial, the object management service 110 notifies the client device that the representation should not be made available for use by the user. The client device 104 then notifies the user that the representation cannot be used as requested. If a reason for the denial is provided, that reason may also be provided to the client device 104 and presented to the user. In some implementations, unless the client device 104 receives from the object management service 110 a denial indicating that the representation should not be made available for use, the client device 104 may assume that the representation can be used as requested.

Figure 4:
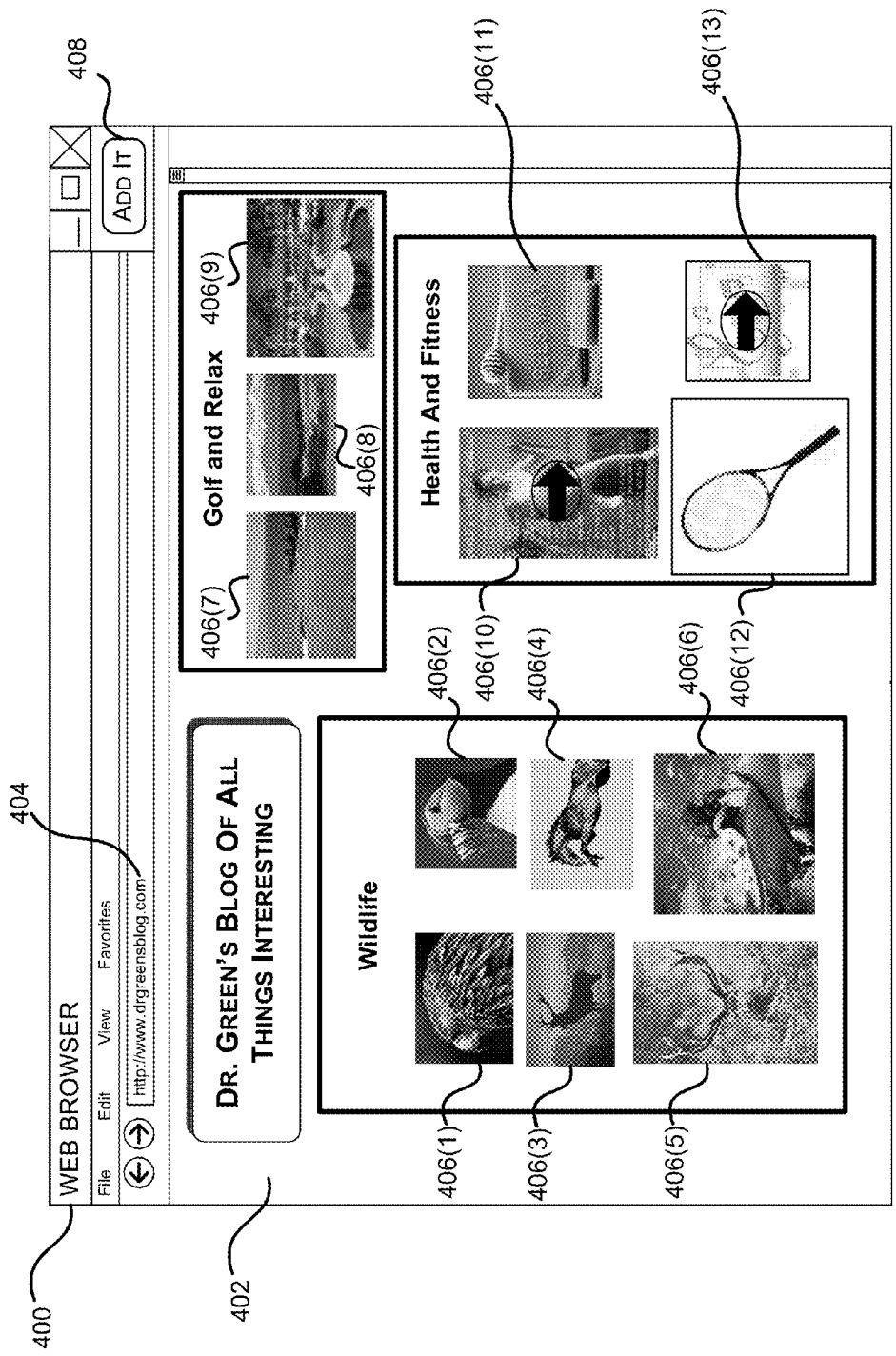
FIG. 4 is a block diagram of an example user interface of a presentation site.

FIG. 4 is a block diagram of an example user interface 400 of a presentation site 402 that includes multiple representations. In this example, the presentation site 402 is located at http://www.drgreensblog.com 404. As illustrated below, the presentation site 402 is both a provider and a consumer site because some of the representations 406(1)-406(13) are provided by the same entity that provides the presenter site and some of the representations are inline linked from other providers. The presentation site 402 may be any site, web page, user interface or other mechanism through which representations are accessible by users and the presenter site 402 of "Dr. Green's Blog of All Things Interesting" is provided only as an example.

As illustrated on the presentation site 402 any type and/or quantity of representations 406 may be provided. In this example, many of the representations 406 are images, such as image representations 406(1)-406(6). Representation 406(10) is a video representation and representation 406(13) is an audio representation. A user may interact with the presentation site 402 in a typical fashion. If the user desires to use one of the representations, such as for creating an object identifier or embedding the representation into a destination presentation site, the user may select the Add It control 408. In other implementations, the user may select a specific representation to add and the implementations described herein may be performed in the same manner for a specifically selected representation.

Returning to FIG. 4, if the user selects the Add It control 408, the presentation site 402 may be processed to identify included representations identifiers for the representations. In some implementations, this may be done on the client device 104 by processing the code of the presentation site to identify the representation identifiers. In other implementations, the code of the presentation site may be provided over a network 108 to the object management service 110 for processing to identify the representation identifiers. Once the representation identifiers are identified, either by the client 104 or the object management service 110, they may be processed to determine the provider of each representation. Similar to identifying the representation identifiers, the providers of the representations may be determined by the client device 104 and/or the object management service 110. For each representation, a request for attribution information may be sent to the provider. This request may be provided before, while or after the representation is presented to the user for possible selection and use. Additional details for identifying representation identifiers and related providers and obtaining attribution information is discussed below with respect to FIG. 8. Additional details for responding to an attribution information request are provided below with respect to FIG. 9.

Figure 5:
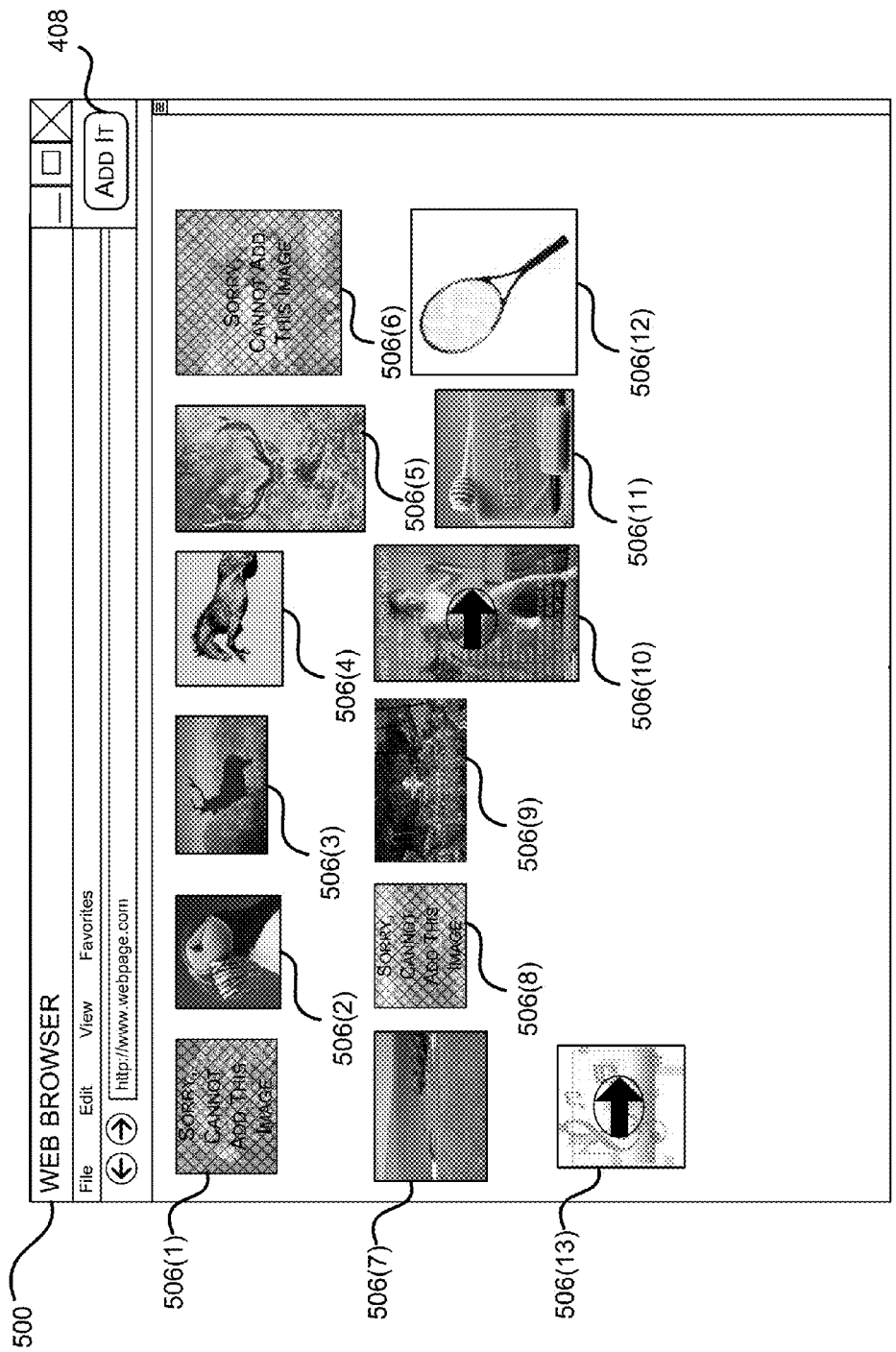
FIG. 5 is a block diagram of an example user interface for presenting representations to a user for selection, according to an implementation.

As long as no denial of use is received in response to the attribution information requests, the representations are presented to the user for selection. In the event a denial of use is received, the representation may be removed from the possible representations available for selection by the user. For example, FIG. 5 illustrates a user interface 500 that includes a presentation of representations to a user in response to a request to use representations from a presentation site, according to an implementation. As illustrated, some of the representations 506(1)-506(13), such as representations 506(1), 506(6), 506(8) have received denials of use in response to an attribution information request and are therefore grayed out and not available for use by the user. In comparison, representations 506(2), 506(3), 506(4), 506(5), 506(7), 506(9), 506(10), 506(11), 506(12), 506(13) did not receive denials of use and/or received attribution information and are available for use by the user. In some implementations, representations may be made available for use if attribution information is received and/or if the provider of the representation is not included on the provider list or otherwise known to the object management service 110. In other implementations, representations may be made available for use as long as a denial of use of not received in response to the attribution information request.

Representations for which a denial has been received from the provider may be grayed out, as illustrated in FIG. 5, not presented to the user for selection or otherwise identified as not available. Likewise, representations that are available for use by the user are presented for display to the user for selection. In some instances, as part of the process of obtaining attribution information, the rights holder and/or provider of the representation may provide or identify a different representation that is to be made available for use by the user. For example, when a response to the attribution information request for the representation 406(9) is received, it may include an identification of another representation that is to be used in place of representation 406(9). In this example, the representation 406(9) is replaced with representation 506(9).

A user may interact with each of the representations to view attribution information and/or supplemental information. Likewise, in the event a representation has received a denial of use, the user may be able to receive attribution information regarding the representation. For example, a rights holder may deny use of the representation but may provide attribution information, such as contact information for the rights holder or other information that the user can access and potentially obtain rights (e.g., rent or purchase) to use the representation. If a rights holder has provided a reason for denying use of the representation, such information may also be provided to the user.

A user may select to use one or more of the representations. For example, a user may select to add one or more of the representations to an object identifier, embed one or more of the representations into another presentation page, such as a blog, or otherwise use the available representation.

Figure 6:
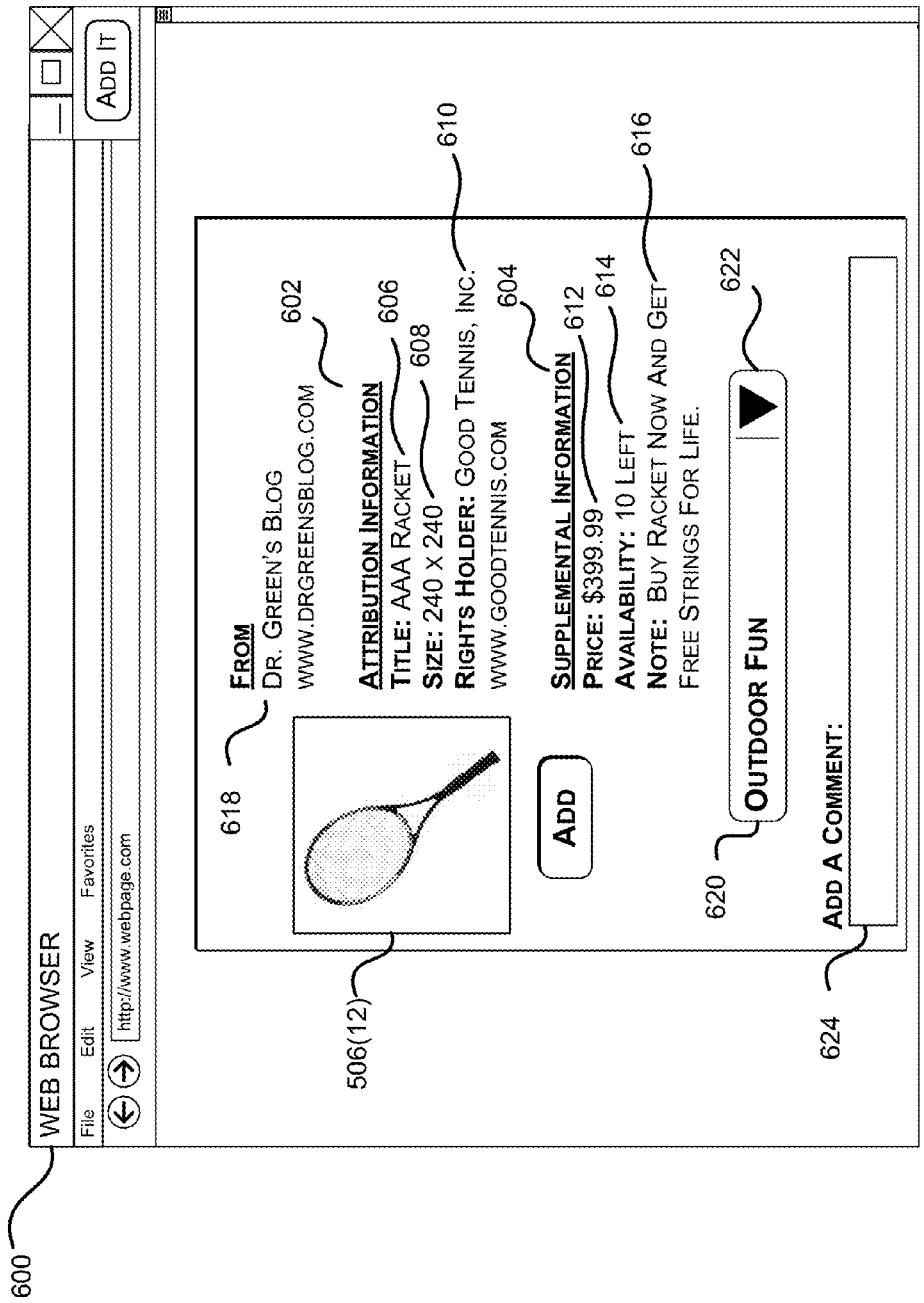
FIG. 6 is a block diagram of an example create object identifier user interface, according to an implementation.

Continuing with the above example, the user selects representation 506(12) for use in creating an object identifier. In response, the user may be provided with an object identifier creation user interface 600, according to an implementation, as illustrated in FIG. 6. The object identifier creation user interface 600 may include the representation 506(12), attribution information 602 and supplemental information 604 returned with the attribution information response for the representation. As discussed above, the attribution information may include information about the representation and/or the represented object, such as the representation title 606, the size 608 at which the representation is to be displayed, the rights holder(s) 610 of the representation and/or object, etc. In this example, the representation 506(12) represents an object—a tennis racket that is for sale. The rights holder 610, "Good Tennis, Inc.," is the entity that is selling the tennis racket. The rights holder has also provided supplemental information about the object, including the price 612, availability 614 and an additional advertising note 616. The attribution information and supplemental information may be updated so that each time the object identifier is viewed, the current information is displayed. For example, while the supplemental information currently shows an availability 614 of 10 tennis rackets remaining, it may be updated each time a racket is sold. This may be done by the provider/rights holder pushing the updated information to the object management service 110 or by the object management service polling the provider for the current supplemental information on a periodic basis and/or in response to a user viewing the object identifier.

The object identifier creation user interface 600 may also identify the presentation site 618 from which the user selected the representation. In this example, the user was viewing the presentation site http://www.drgreensblog.com when they selected to use the representation 506(12). In obtaining attribution information, the object management service 110 identified www.goodtennis.com as the provider of the representation. By maintaining both the location of the provider of the representation as well as the presentation site, a user viewing the object identifier can select to view either.

The object identifier creation user interface 600 may also identify a set 620 into which the object identifier is to be included. A user may select a different set or create a new set through use of the selection list control 622. Finally, a user may select to add their own comment 624 that will be included with and associated with the object identifier.

Once an object identifier has been created, the user who created the object identifier, or any other user who is interacting with the object management service 110, can select to view the object identifier. In some instances, the user who created the object identifier may choose not to share the object identifier with others, or to share it only with other users known to or otherwise associated with the user.

Figure 7:
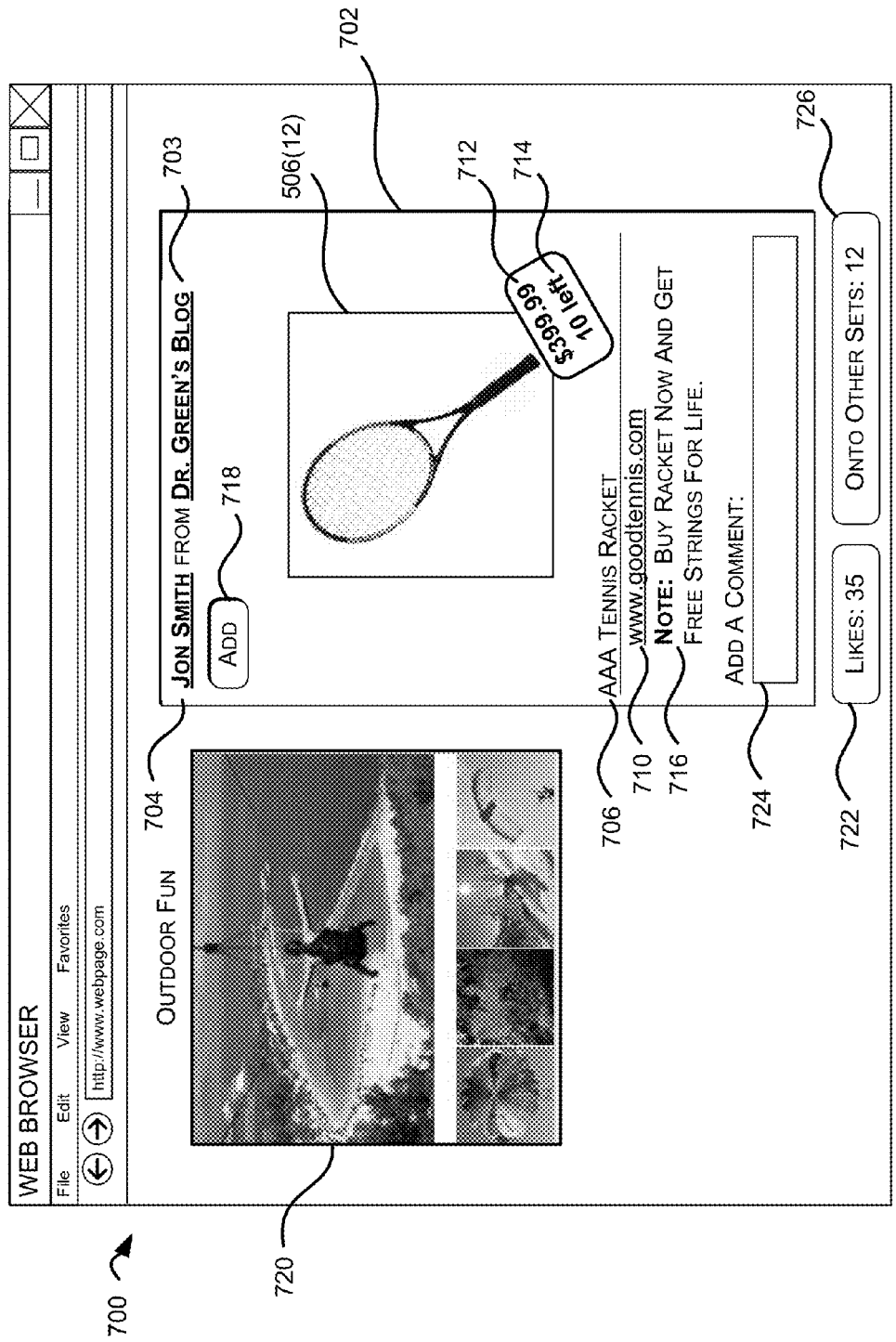
FIG. 7 is a block diagram of an example user interface of an object identifier, according to an implementation.

In interacting with an object identifier, a user may obtain additional information about the object identifier or perform any actions associated with the object identifier. For example, turning to FIG. 7, a block diagram of an example user interface 700 identifying additional details about the object identifier created using the object identifier creation user interface 600 (FIG. 6), according to an implementation, is provided. As illustrated in the user interface 700, the user has selected the object identifier 702 and requested to obtain additional information about the object identifier 702. In this example, the user interface 700 provides additional information associated with the object identifier 702. The additional information for the object identifier 702 includes the representation 506(12) associated with the object identifier 702, an identification of the creator 704 of the object identifier "John Smith," and an identification 703 from the presentation site from where the representation was obtained, in this case "Dr. Green's Blog."

The attribution information and/or supplemental information may also be presented as part of the object identifier 702. For example, the title 706 of the representation may be provided along with an identification 710 of the provider and/or rights holder of the representation and/or object. The price 712, availability 714 and advertisement 716 may also be included in the object identifier 702. In some implementations, a user viewing the object identifier 702 may select to add the object identifier to another set, through selection of the add control 718.

In addition to providing additional information about the object represented by the object identifier 702, the user interface 700 may also provide a higher level overview of the set with which the object identifier 702 is associated. For example, the overview images 720 may represent a collage of the object identifiers associated with the set that includes the object identifier 702.

The user interface 700 may also identify other users of the object management service 110 who have indicated whether they like or dislike the object identifier 702 or commented on the object identifier. For example, the Likes counter 722 identifies that 35 other users have identified that they like the object identifier 702. Users may also provide comments to the object identifier using the comment control 924. Likewise, the Onto Other Sets counter 726 identifies that the object identifier 702 and/or the representation 506(12) has been added to 12 other sets that are managed by the object management service 110.

Figure 8:
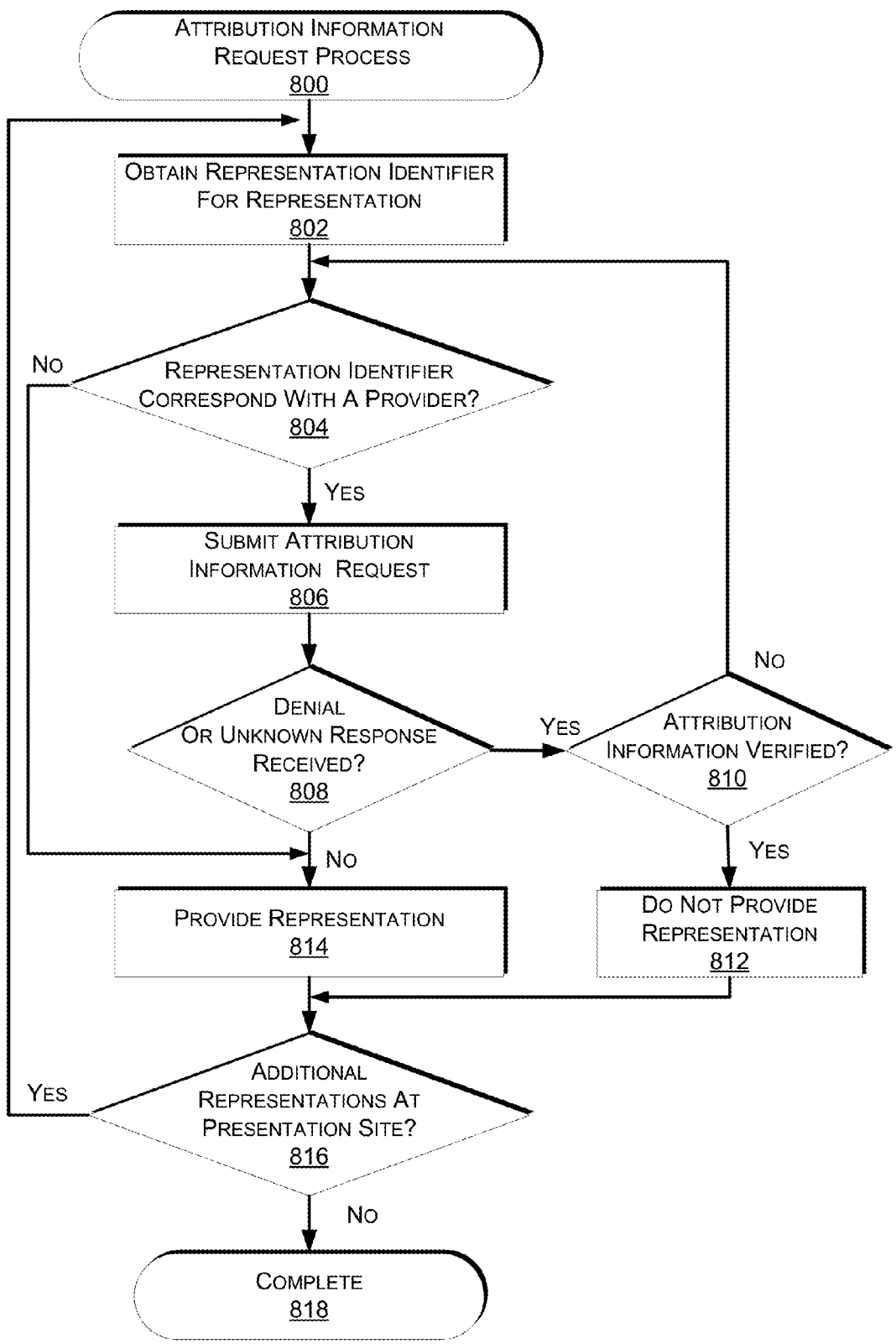
FIG. 8 illustrates an example process for obtaining attribution information for a representation, according to an implementation.

FIG. 8 illustrates an example process 800 for obtaining attribution information for a representation, according to an implementation. The example process 800 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, solid-state drives, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 800 begins upon receiving a request to use a representation at a presentation site. Upon receiving a request to use a representation at a presentation site, a representation identifier for a representation available at the presentation site is identified, as in 802. In some implementations, representation identifiers may be identified by processing the code (e.g., HTML code) of the presentation site for identifiers or tags identifying the representation. For the identified representation identifier, a determination is made as to whether the representation identifier corresponds with a provider, as in 804. In some implementations, determining if a representation identifier corresponds with a provider may be accomplished by determining if a provider is identified in the representation identifier directly. For example, if the representation identifier does not include a locator for the provider of the representation, it may be determined that the provider of the representation is the same as the provider of the presentation site. In another example, if the representation identifier does not include a locator for the provider of the representation, the code of the presentation site may be further processed to determine if there is a base locator that identifies a provider for any representation identifiers that don't otherwise identify a provider. As still another example, the locator may identify the provider directly.

In other implementations, determining if a representation identifier corresponds with a provider may be determined by comparing the representation identifier, or a portion thereof, with a provider list. A provider list may maintain locators or identifiers that if matched with the representation identifier can be used to identify the provider of the representation. For example, if the representation identifier includes http://www.xyz1234static5.com/picture.jpg, a seemingly random representation identifier, it may be compared to a provider list to determine if any provider has identified an association with http://www.xyz1234static5.com. For example, PhotoStore, Inc. (www.photostore.com) may have previously identified that they provide images from a location with an address of http://www.xyz1234static5.com. If a match is found, the associated provider is determined to be the provider of the representation.

In still other implementations, a code may be included in the representation identifier that may be matched with a code identified in the provider list and used to identify the provider. For example, the representation identifier http://www.CDNGlobal1234.com/a9546831.photo.jpg may be processed and determined that a9546831 is a code included in the representation identifier that is associated in the provider list with a provider. As still another example, if examination of the representation identifier identifies a CDN, the representation identifier may be provided to the CDN with a request that the CDN identify the provider of the representation. The CDN in response may identify the provider for which they are delivering representations.

If it is determined that the representation identifier corresponds with a provider, an attribution information request is submitted to the identified provider, as in 806. In some implementations, the attribution information request may be submitted to an API of the provider. The attribution information request may include the representation identifier or a portion thereof. In other implementations, additional information, such as the identity of the presentation site may also be included. If it is determined that the representation does not correspond with a provider, the representation may be provided to the user, as in 814.

After submitting the attribution information request, a determination is made as to whether a denial of use response or unknown representation response was received from the provider, as in 808. If it is determined that the received response is a denial or unknown representation response, a determination may be made as to whether the attribution information included with the denial and/or unknown representation response verifies that the response is from the provider and/or rights holder(s) of the representation. If the attribution information is not verified and/or if the response is an unknown response (i.e., the provider has indicated that they are not the provider of the representation), the example process 800 may return to block 804 and continue until the appropriate provider is identified.

However, if it is determined at decision block 810 that the response is a denial and the corresponding attribution information verifies that the response is from the provider and/or rights holder(s), the representation is not provided to the user, as in 812. In some implementations, the user may receive a communication indicating that the representation is not available for use. In other implementations, the representation may be removed and not presented to the user for selection. In still other implementations, the representation may be presented in a grayed out manner along with an indication that it is not available for use. In some implementations, the provider and/or rights holder may also provide a reason as to why the representation is not available for use.

Returning to decision block 808, as long as a denial and/or unknown response is not received or included in an attribution information response, the representation is presented to the user for selection, as in 814. In some implementations, if attribution information and/or supplemental is received, some or all of the attribution information and/or supplemental information may be provided to the user. Likewise, if a restriction is provided with the attribution information response, such restrictions may be applied to the use of the representation. In some implementations, the attribution information and/or supplemental information may be provided with the representation. In other implementations, the attribution information and/or supplemental information may only be provided to the user if the user selects to use the representation.

Turning to decision block 816, the example process 800 may determine whether there are additional representations available at the presentation site. If it is determined that additional representations remain, the example process 800 returns to block 802 and continues. If no additional representations remain, the example process 800 completes, as in 818.

While the example process 800 is illustrated as obtaining attribution information for representations in a sequential manner, in other implementations the example process may be performed on multiple representations in parallel. Likewise, while the example process 800 illustrates that representations are provided to the user after a response to an attribution information request has been received, in other implementations the representations may be provided to the user at the beginning of the example process 800. In such an implementation, the representations may be initially provided for selection by the user and for any in which a denial is received, they may be removed from the representations available for selection by the user.

Figure 9:
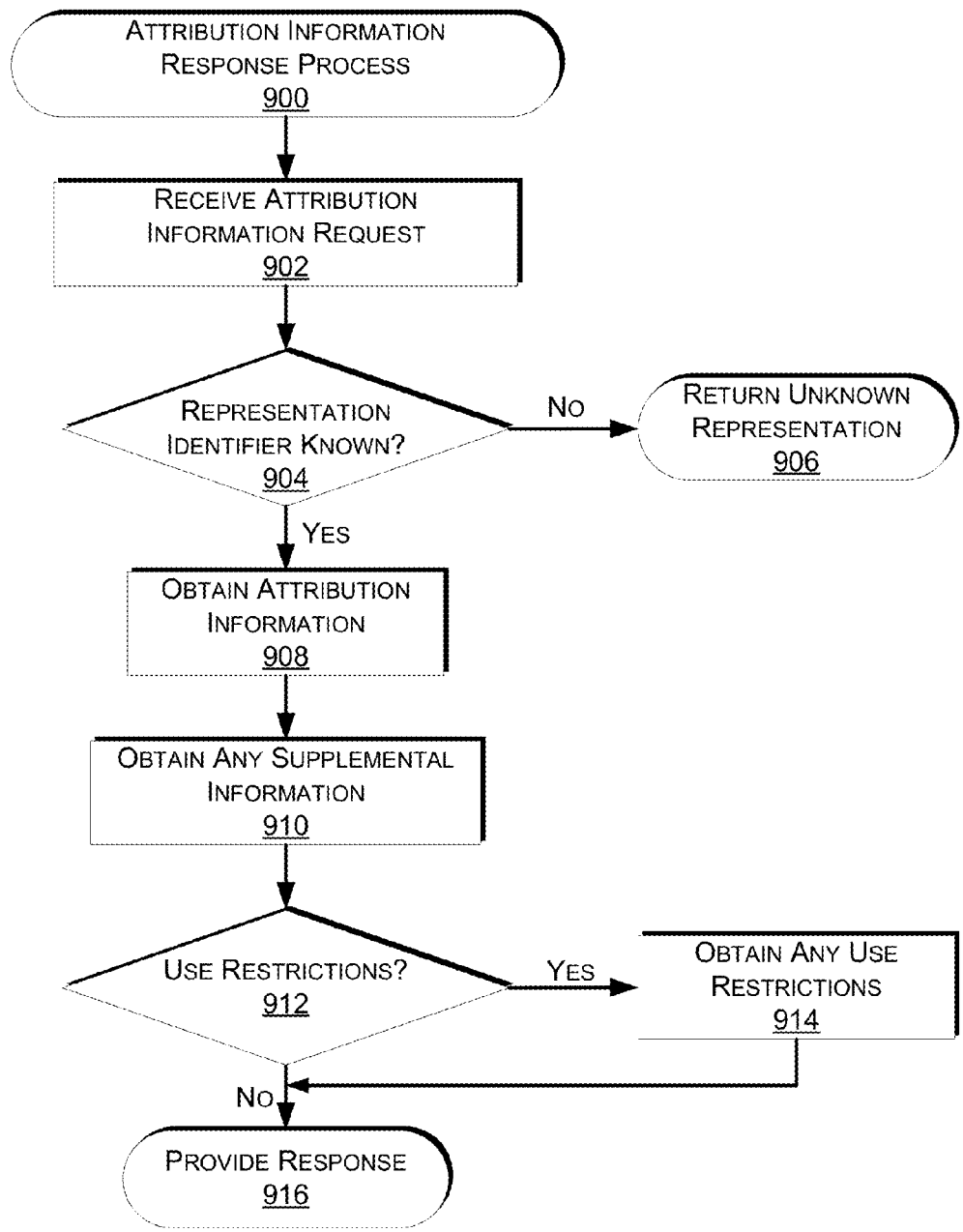
FIG. 9 illustrates an example process for responding to an attribution information request, according to an implementation.

FIG. 9 illustrates an example process 900 for responding to an attribution information request, according to an implementation. The example process 900 begins upon receipt of an attribution information request for a representation, as in 902. Upon receiving an attribution information request, a determination is made as to whether the representation identifier, or other identifier included in the received attribution information request is known, as in 904. If it is determined that the representation identifier is not known, i.e., the representation is not provided by the provider that received the request, an unknown response is returned, as in 906.

If the received representation identifier is known, attribution information for the representation is obtained, as in 908. As discussed above, attribution information may be any information regarding the representation and/or the represented object as well as information regarding the display of the representation. For example, the attribution information may include the title of the representation, the identification of the rights holder(s), the identification of the provider, the size of the representation, a representation that is to be used, etc. Supplemental information may also be obtained and associated with the attribution information for the representation, as in 910. As discussed above, supplemental information may be any additional information that is to be associated with the representation. Supplemental information may include, but is not limited to, pricing information for the representation and/or the object, location of the rights holder(s), advertisements, actions (e.g., purchase control button), availability information, etc. Supplemental information may be provided by the rights holder(s), the provider, and/or other external sources.

In addition to obtaining attribution information and supplemental information, a determination may be made as to whether there are any restrictions regarding the use of the representation, as in 912. Any use restrictions may be obtained, as in 914. For example, a rights holder may deny use of the representation, reject inline linking to the representation, reject copying of the representation, etc. Likewise, providers may restrict how representations may be used. For example, a provider may not allow inline linking to a representation. Thus, even if the rights holder(s) is willing to provide inline linking to the representation, the provider of the representation may limit that use.

Once the attribution information and any supplemental information have been obtained, a response is prepared and provided that includes the attribution information and any supplemental information, as in 916. If a use restriction has been identified and obtained, such a restriction may also be included in the response.

Figure 10:
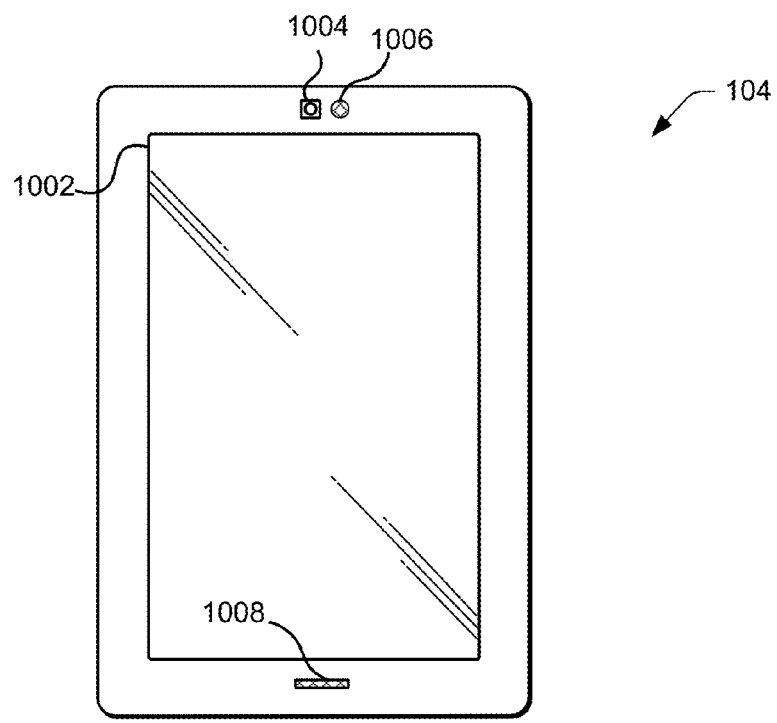
FIG. 10 illustrates an example computing device that can be used in accordance with various implementations.

FIG. 10 illustrates an example client device 104 that can be used in accordance with various implementations described herein. In this example, the client device 104 includes a display 1002 and optionally at least one input component 1004, such as a camera, on the same side of the device as the display 1002. The client device 104 may also include an audio transducer, such as a speaker 1006, and optionally a microphone 1008. Generally, the client device 104 may have any form or input/output components that allow a user to interact with the client device 104. For example, the various input components for enabling user interaction with the device may include a touch-based display 1002 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 11:
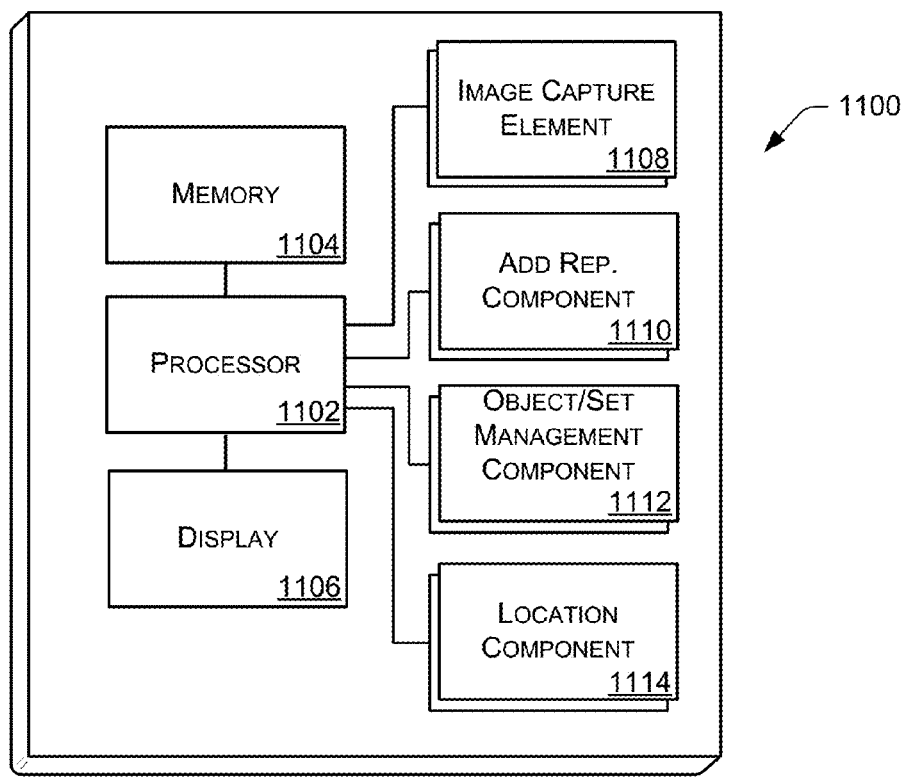
FIG. 11 illustrates an example configuration of components of a computing device, such as that illustrated in FIG. 10.

In order to provide the various functionality described herein, FIG. 11 illustrates an example set of basic components 1100 of a client device 104, such as the client device 104 described with respect to FIG. 10 and discussed herein. In this example, the device includes at least one central processor 1102 for executing instructions that can be stored in at least one memory device or element 1104. As would be apparent to one of ordinary skill in the art, the device can include many types of memory, data storage or computer-readable storage media, such as a first data storage for program instruction for execution by the processor 1102. Removable storage memory can be available for sharing information with other devices, etc. The device typically will include some type of display 1106, such as a touch-based display, electronic ink (e-ink), organic light emitting diode (OLED) or liquid crystal display (LCD).

As discussed, the device in many implementations will include at least one image capture element 1108, such as one or more cameras that are able to image objects in the vicinity of the device. An image capture element can include, or be based at least in part upon any appropriate technology, such as a CCD or CMOS image capture element having a determined resolution, focal range, viewable area, and capture rate. The device can include at least one add representation component 1110 for performing the process of obtaining attribution information for a representation, and/or interacting with the object management service 110 as part of the process of creating an object identifier and or otherwise utilizing a representation. For example, the client device may be in constant or intermittent communication with the object management service 110 and may exchange information, such as representations, representation identifiers, descriptions, provider information, etc. with the object management service 110 as part of the process for obtaining attribution information for a representation and/or creating an object identifier.

The device may also include an object/set management component 1112 that stores and manages information about existing object identifiers and/or sets created by or otherwise associated with the user of the client device. Storing and maintaining such information on the device provides the ability for a user to interact with and use many of the various implementations discussed herein even in the event the client device cannot communicate with the object management service 110.

The device also can include at least one location element 1114, such as GPS, NFC location tracking or Wi-Fi location monitoring. Location information obtained by the location element 1114 may be used with the various implementations discussed herein to identify the location of the user, source location, object location, and the like and support the creation, modification and/or management of sets and/or object identifiers.

The example client device 104 may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 12:
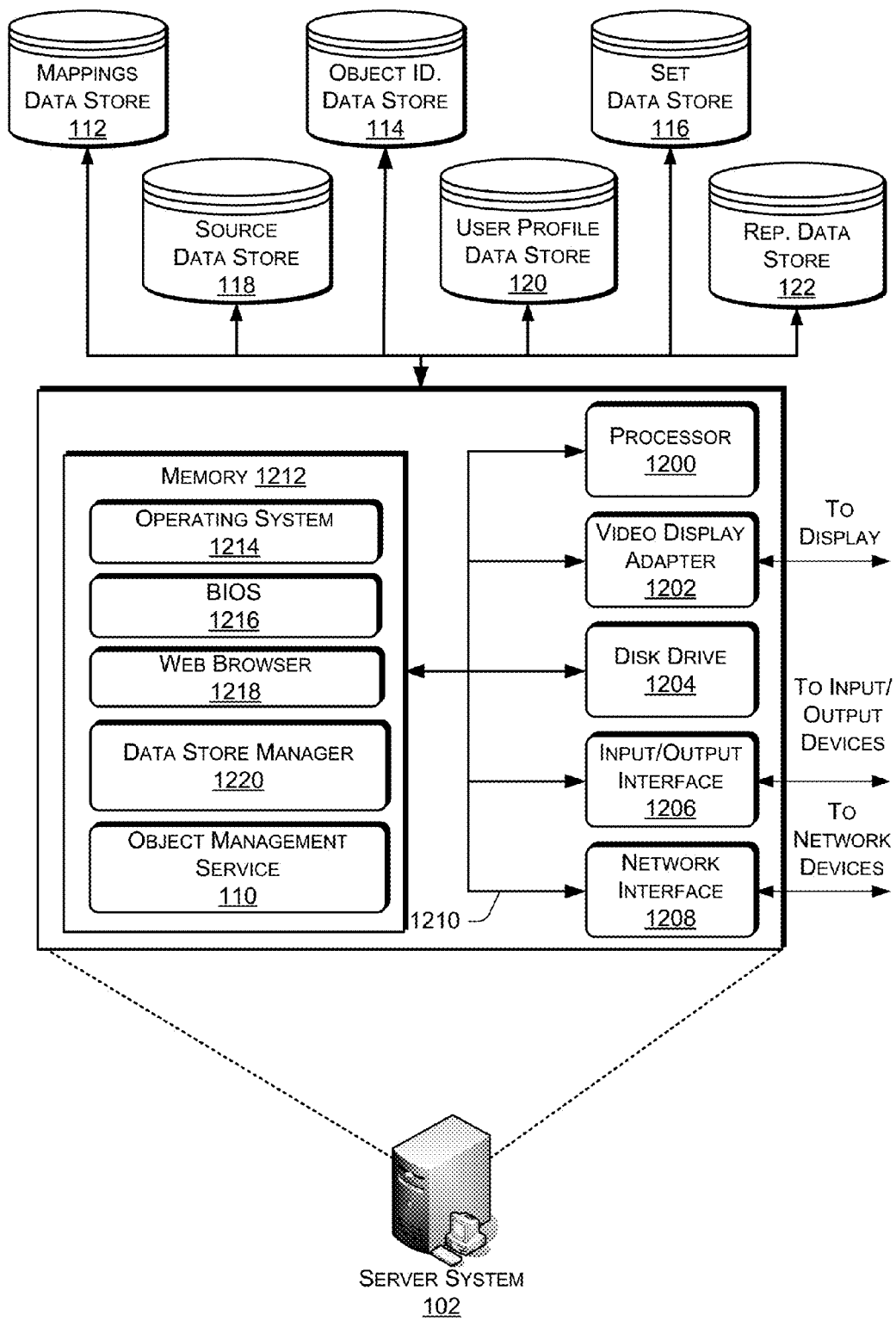
FIG. 12 is a pictorial diagram of an illustrative implementation of a server system that may be used for various implementations.

FIG. 12 is a pictorial diagram of an illustrative implementation of a server system, such as the server system 102, that may be used in the environment of FIG. 1. The server system 102 may include a processor 1200, such as one or more redundant processors, a video display adapter 1202, a disk drive 1204, an input/output interface 1206, a network interface 1208, and a memory 1212. The processor 1200, the video display adapter 1202, the disk drive 1204, the input/output interface 1206, the network interface 1208, and the memory 1212 may be communicatively coupled to each other by a communication bus 1210.

The video display adapter 1202 provides display signals to a local display (not shown in FIG. 12) permitting an operator of the server system 102 to monitor and configure operation of the server system 102. The input/output interface 1206 likewise communicates with external input/output devices not shown in FIG. 12, such as a mouse, keyboard, scanner, or other input and output devices that can be operated by an operator of the server system 102. The network interface 1908 includes hardware, software, or any combination thereof, to communicate with other computing devices. For example, the network interface 1908 may be configured to provide communications between the server system 102 and other computing devices, such as the client device 104, via the network 108, as shown in FIG. 1.

The memory 1212 generally comprises random access memory (RAM), read-only memory (ROM), flash memory, and/or other volatile or permanent memory. The memory 1212 is shown storing an operating system 1214 for controlling the operation of the server system 102. A binary input/output system (BIOS) 1216 for controlling the low-level operation of the server system 102 is also stored in the memory 1212.

The memory 1212 additionally stores program code and data for providing network services that allow client devices 104 and external sources 106 to exchange information and data files with the server system 102 and/or the object management service 110. Accordingly, the memory 1212 may store a browser application 1218. The browser application 1218 comprises computer executable instructions, that, when executed by the processor 1200, generate or otherwise obtain configurable markup documents such as Web pages. The browser application 1218 communicates with a data store manager application 1220 to facilitate data exchange and mapping between the mappings data store 112, the object identifier data store 114, the set data store 116, the source data store 118, the user profile data store 120, and/or the representations data store 122, client devices, such as the client device 104 shown in FIG. 1 and/or external sources, such as the external sources 106 shown in FIG. 1.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 112-122 as needed to execute aspects of one or more applications for the client device 104, the external sources 106 and/or the object management service 110. The server system 102 provides access control services in cooperation with the data stores 112-122 and is able to generate content such as text, graphics, audio, video and/or object identifier or set related information (e.g., representations, context, descriptions, mappings, analytics about user interfaces) to be transferred to the client device 104 or external sources 106.

The data stores 112-122 can include several separate data tables, databases or other data storage mechanisms and media for storing data relating to a particular aspect. For example, the data stores 112-122 illustrated include mechanisms for storing content, user information, mappings and external source information, representations, which can be used to generate and deliver content to client devices 104 and/or external sources 106 (e.g., sets, object identifiers, representations) and control actions to be performed.

It should be understood that there can be many other aspects that may be stored in the data stores 112-122, such as access rights information, which can be stored in any of the above listed mechanisms as appropriate or in additional mechanisms of any of the data stores 112-122. The data stores 112-122 are operable, through logic associated therewith, to receive instructions from the server system 102 and obtain, update or otherwise process data in response thereto. In one example, provider might respond to an attribution information request for a representation and provide attribution information for the representation. In this case, the representations data store 122 might be accessed and the representation and the attribution information stored therein or otherwise associated. The information can then be returned to the user, such as in user interface delivered to a client device 104 that the user is able to view.

The memory 1212 may also include the object management service 110, discussed above. The object management service 110 may be executable by the processor 1200 to implement one or more of the functions of the server system 102. In one implementation, the object management service 110 may represent instructions embodied in one or more software programs stored in the memory 1212. In another implementation, the object management service 110 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction in FIG. 12 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
one or more processors; and
a memory coupled to the one or more processors and storing program instructions that when executed by the one or more processors cause the one or more processors to at least:
identify a representation presented on a web page based at least in part on an input from a user;
identify, based at least in part on a representation identifier included in a code of the web page, a provider of the representation;
provide the representation identifier to the provider and request attribution information related to the representation;
receive a response that includes the attribution information from a source other than the user;
determine supplemental information related to an object that is represented in the representation;
include the representation and the supplemental information in a user-created object identifier;
identify a second representation based at least in part on the attribution information, wherein the object is represented in the second representation, and wherein the representation and second representation are different;
replace the representation included in the object identifier with the second representation such that the object identifier includes the second representation; and
send for presentation the second representation for selection and use by the user, the supplemental information, and at least a portion of the attribution information of the object identifier.

2. The computing system of claim 1, wherein the attribution information includes a use restriction relating to a size of the representation.

3. The computing system of claim 1, wherein the attribution information includes a type of the representation or presentation information for presenting the representation.

4. The computing system of claim 1, wherein a provider of the web page and the provider of the representation are a same external source.

5. The computing system of claim 1, wherein the representation is a digital image.

6. The computing system of claim 1, wherein the representation is a digital multimedia.

7. The computing system of claim 1, wherein the supplemental information related to the object represented in the representation includes price information for the object, and wherein the program instructions that when executed by the one or more processors further cause the one or more processors to send the price information for presentation to a second user.

8. The computing system of claim 1, wherein the supplemental information related to the object represented in the representation includes availability information for the object, and wherein the program instructions that when executed by the one or more processors further cause the one or more processors to send the availability information for presentation to a second user.

9. The computing system of claim 1, wherein the program instructions further cause the one or more processors to at least:
update the supplemental information of the object identifier based at least in part on a current geographic location of a second user; and
send for presentation the updated supplemental information.

10. The computing system of claim 1, wherein a source of the web page and a source of the representation are different, and wherein the source of the web page and the provider of the representation are not the user.

11. The computing system of claim 1, further comprising:
determining that the representation is inline linked from the provider prior to providing the representation identifier to the provider, wherein a source of the web page is not the provider.

12. A computer-implemented method, comprising:
under control of one or more computing systems configured with executable instructions,
identifying a representation identifier included in a code of a presentation site;
determining to request information for a representation identified by the representation identifier;
including the representation in a user-created object identifier;
submitting an information request to a provider of the representation;
receiving supplemental information related to an object represented in the representation and attribution information related to the representation;
identifying a second representation based at least in part on the attribution information, wherein the object is represented in the second representation, and wherein the representation and the second representation are different;
replacing the representation included in the object identifier with the second representation such that the object identifier includes the second representation; and
including supplemental information and at least a portion of the attribution information in the user-created object identifier.

13. The computer-implemented method of claim 12, further comprising:
identifying, based at least in part on the representation identifier, a provider of the representation.

14. The computer-implemented method of claim 13, wherein identifying, based at least in part on the representation identifier, includes comparing the representation identifier with a provider list to identify the provider.

15. The computer-implemented method of claim 12, further comprising:
identifying that the representation is inline linked from a provider, and wherein the attribution information is received from the provider.

16. The computer-implemented method of claim 12, wherein submitting the information request to a provider includes submitting at least a portion of the representation identifier to an application programming interface of the provider.

17. The computer-implemented method of claim 12, further comprising:
determining to obtain an authorization to use the representation; and
including in the information request, an authorization request.

18. The computer-implemented method of claim 12, further comprising:
receiving a request to include the second representation in the user-created object identifier.

19. The computer-implemented method of claim 12, wherein the supplemental information related to the object represented in the representation includes price information for the object, and wherein the computer-implemented method further comprises sending the price information for presentation to a second user.

20. The computer-implemented method of claim 12, wherein the supplemental information related to an object represented in the representation includes availability information for the object, and wherein the computer-implemented method further comprises sending the availability information for presentation to a second user.

21. A non-transitory computer-readable storage medium storing instructions to respond to an attribution information request for a representation, the instructions when executed by a processor causing the processor to at least:
receive the attribution information request for a representation;
obtain supplemental information related to an object represented in the representation;
obtain from a provider of the representation: 1) attribution information related to the representation and 2) a second representation, wherein the object is represented in the second representation, and wherein the representation and the second representation are different;
return the supplemental information;
return an attribution information response, the attribution information response including: 1) at least a portion of the obtained attribution information related to the representation and 2) the second representation; and
modify a user-created object identifier such that it includes the second representation, at least a portion of the attribution information, and the supplemental information.

22. The non-transitory computer-readable storage medium of claim 21, wherein the attribution information request includes a representation identifier.

23. The non-transitory computer-readable storage medium of claim 21, wherein the attribution information includes at least one of a type of the representation, a dimension for presentation of the representation, a title of the representation, a representation identifier, an identity of a rights holder, or additional information specifying how the representation is to be presented.

24. The non-transitory computer-readable storage medium of claim 21, wherein the attribution information response includes at least one restriction regarding a presentation of the second representation.

25. The non-transitory computer-readable storage medium of claim 24, wherein the restriction is provided by a provider of the second representation.

26. The non-transitory computer-readable storage medium of claim 21, wherein the attribution information response includes at least one restriction that denies use of the representation.

27. The non-transitory computer-readable storage medium of claim 21, wherein the attribution information response includes at least one restriction that does not allow inline linking to the second representation.

* * * * *